(12) United States Patent
Otto et al.

(10) Patent No.: US 7,483,278 B2
(45) Date of Patent: Jan. 27, 2009

(54) TELECOMMUNICATIONS TERMINAL MODULE AND COMBINATION INCLUDING A TERMINAL MODULE

(75) Inventors: Hans-Dieter Otto, Wipperfurth (DE); Cornel Schaub, Wuppertal (DE); Peter Wurster, Wuppertal (DE); Friedrich Wilhelm Denter, Castrop-Rauxel (DE)

(73) Assignee: 3M Innovative Properties Company, St. Paul, MN (US)

( * ) Notice: Subject to any disclaimer, the term of this patent is extended or adjusted under 35 U.S.C. 154(b) by 111 days.

(21) Appl. No.: 10/504,947

(22) PCT Filed: Mar. 4, 2003

(86) PCT No.: PCT/US03/06599

§ 371 (c)(1),
(2), (4) Date: Apr. 27, 2005

(87) PCT Pub. No.: WO03/079644

PCT Pub. Date: Sep. 25, 2003

(65) Prior Publication Data

US 2005/0221665 A1    Oct. 6, 2005

(30) Foreign Application Priority Data

Mar. 11, 2002    (DE) .......................... 202 03 912 U

(51) Int. Cl.
*H01R 9/00* (2006.01)

(52) U.S. Cl. .................. 361/823; 361/825; 361/824; 361/119; 361/756; 439/76.1

(58) Field of Classification Search .............. 361/823, 361/796, 799, 824, 825, 756, 788, 119, 807; 174/520; 439/76.1
See application file for complete search history.

(56) References Cited

U.S. PATENT DOCUMENTS

| | | | | |
|---|---|---|---|---|
| 4,070,081 | A | * | 1/1978 | Takahashi .................... 439/372 |
| 4,581,489 | A | * | 4/1986 | Nozick ....................... 379/329 |
| 4,763,226 | A | * | 8/1988 | Pelletier ..................... 361/823 |
| 4,826,449 | A | | 5/1989 | Debortoli et al. |
| 5,043,847 | A | * | 8/1991 | Deinhardt et al. ........... 361/736 |
| 5,096,437 | A | | 3/1992 | Levy |
| 5,114,356 | A | * | 5/1992 | Taybl et al. .................. 439/713 |
| 5,253,140 | A | * | 10/1993 | Inoue et al. .................. 361/728 |
| 5,595,507 | A | * | 1/1997 | Braun et al. ................. 439/716 |
| 5,779,504 | A | * | 7/1998 | Dominiak et al. ........... 439/709 |
| 5,800,187 | A | * | 9/1998 | Vermon et al. ................ 439/92 |
| 6,243,250 | B1 | * | 6/2001 | Cater ......................... 361/119 |

(Continued)

FOREIGN PATENT DOCUMENTS

DE      37 28 368 C1    11/1988

(Continued)

*Primary Examiner*—Dameon E Levi
(74) *Attorney, Agent, or Firm*—Gregg H. Rosenblatt

(57) ABSTRACT

A telecommunications terminal module (10) includes the following features. The terminal module (10) includes at least one location (36) for mounting a section (32,34, 64) of a telecommunications rack (12), the mounting location (36) is provided with surfaces (38,40,42) facing said section (32, 34, 64), and the surfaces (38, 40, 42) of said mounting location (36) are configured such that said terminal module (10) can be tilted from the condition as secured to said rack (12) relative to said section (32, 34, 64) about one rim (70) thereof.

12 Claims, 3 Drawing Sheets

U.S. PATENT DOCUMENTS

| | | | | |
|---|---|---|---|---|
| 6,654,223 | B1 * | 11/2003 | Bippus et al. | 361/118 |
| 6,654,255 | B2 * | 11/2003 | Kruse et al. | 361/799 |
| 6,821,153 | B2 * | 11/2004 | Otto et al. | 439/620.08 |
| 7,442,094 | B2 * | 10/2008 | Denter et al. | 439/719 |

FOREIGN PATENT DOCUMENTS

| | | |
|---|---|---|
| DE | 9412847 U1 | 11/1994 |
| DE | 196 52 422 C1 | 4/1998 |
| DE | 197 10 000 C1 | 4/1998 |
| DE | 298 02 727 U1 | 5/1998 |
| DE | 198 44 095 C1 | 3/2000 |
| DE | 199 48 400 A1 | 5/2001 |
| DE | 1122821 A2 * | 8/2001 |
| DE | 1750460 A1 * | 7/2007 |
| EP | 1 005 235 A2 | 5/2000 |
| EP | 1122821 * | 8/2001 |
| GB | 2337872 A * | 1/1999 |
| JP | 63164288 | 7/1988 |
| WO | WO 98/44595 | 10/1998 |

* cited by examiner

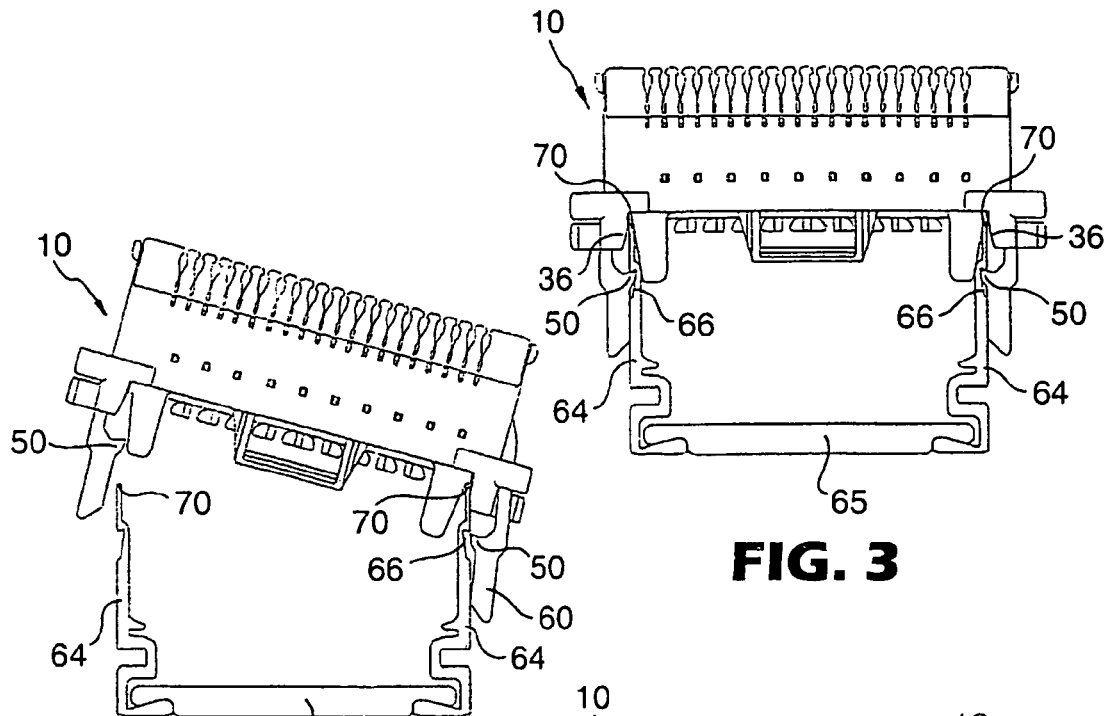
FIG. 3
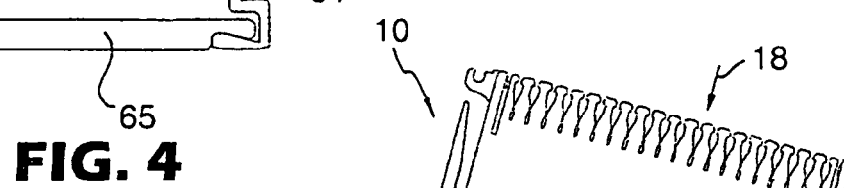
FIG. 4
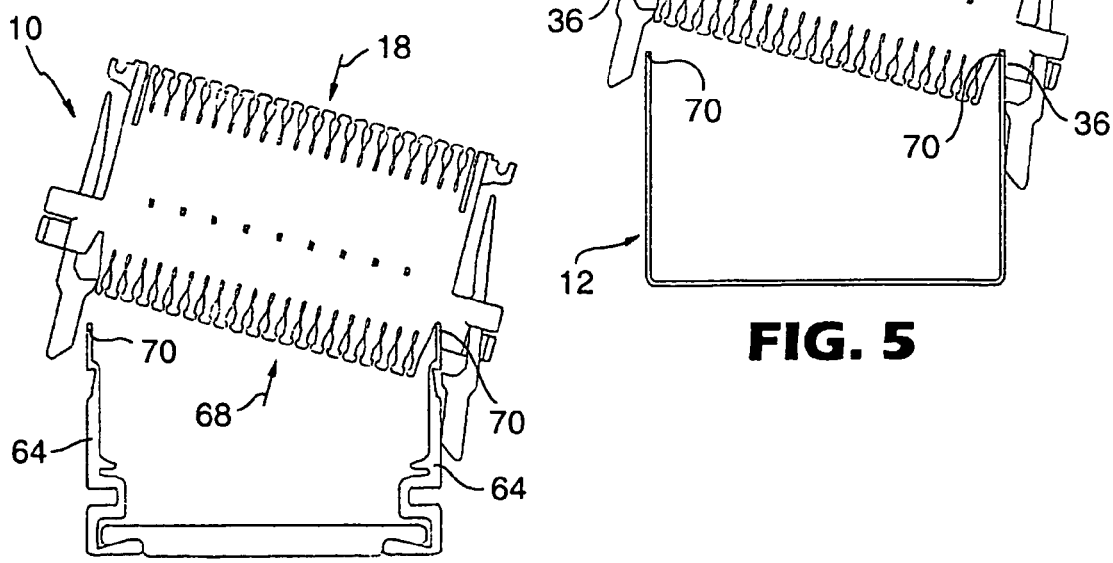
FIG. 5
FIG. 6

TELECOMMUNICATIONS TERMINAL MODULE AND COMBINATION INCLUDING A TERMINAL MODULE

FIELD OF THE INVENTION

The invention relates to a telecommunications terminal module as well as to a combination of a terminal module including cables and cross-coupling wires terminated thereby.

BACKGROUND OF THE INVENTION

In the telecommunications field there is a need in the course of communicating signals between a subscriber and an office (exchange) of the telecommunications company to interconnect various cable cores at numerous distribution points. More particularly, it is often necessary in distribution points to interconnect incoming and outgoing cable cores via numerous cross-coupling wires. For this purpose, terminal modules are usually employed featuring at least two rows of terminal contacts for front access and are thus configured mainly as blocks. These terminal blocks are mounted in racks provided in a distribution point.

Racks are formed particularly cost-effective by so-called trays fabricated of thin sheet-metal and usually having two side walls oriented substantially in parallel. The terminal modules are provided with mounting locations, for example in the form of rear side slot-type openings, in which the thin side walls of the tray-type racks or tabs configured protruding therefrom can be mounted. By means of latching devices the terminal modules can be secured to the racks featuring openings or ledges for engaging the latching elements. In certain situations it is necessary to remove the rack-mounted terminal modules at least temporarily or at least to swivel them out of their mounted position. This may be necessary, for example, when making changes to the terminal modules or to the overvoltage or overcurrent protection components incorporated therein.

German patent DE 37 28 368 A1 relates to a block-type terminal module including latching fastener means, by means of which the terminal module can be latch-mounted on two parallel rods of substantially circular cross-section. When the fastener on the one side is released, the terminal module can be swiveled about the round bar to the other side whilst remaining secured thereto. This is a special mounting system which is incompatible with other systems, for example with the aforementioned trays or two parallel sheet-metal components.

SUMMARY OF THE INVENTION

The invention relates to a terminal module for mounting in a rack mounting system including thin-walled sections permitting by simple ways changes or replacements to be made to the components employed in the terminal module.

The invention thus provides a telecommunications terminal module including at least one location for mounting a section of a telecommunications rack. In other words, the terminal module is rack-mountable. The mounting location of the terminal module is provided with surfaces facing the section of the rack. Furthermore, the surfaces of the mounting location are configured such that the terminal module can be tilted from the condition as secured to the rack relative to the section of the rack about one rim thereof. Preferably at least one fastener is provided by which the terminal module is secured to the rack releasably. The fastener is preferably configured as a protruding latching hook or protuberance for pliantly engaging an opening in the thin-walled section of the rack at an edge or protuberance configured thereon.

The surfaces of the mounting location substantially involve, as appreciated cross-sectionally, at least one slot of suitable depth configured in the rear side of the terminal module. The mounting location in general, more particularly the slot, may include for example a widening within which the rim portion of the rack section is located in the mounted condition of the terminal module. As a result of this, the terminal module is defined in directions perpendicular to the surface of the section. In other words, the terminal module is non-shiftingly positioned laterally by defined means on a rack from which the sections in consideration extend vertically. Making the surface in the direction of the extent of the section and the fastening so that the terminal module cannot be removed from the rack to the front is achieved preferably by the fastener as described.

The surfaces of the mounting location in which the section of the rack is mounted are configured such that they depart from the contour of the mounted section of the rack and the terminal module can be tilted from the condition as secured to the rack relative to the section of the rack about a rim thereof. This represents a novel feature as compared to known terminal modules in that this possibility of tilting the terminal module relative to the section of the rack was hitherto not available with such terminal modules. Instead, as cited above, other rack mounting systems merely involving round rods were known, for example, for permitting such a movement of a terminal module. In addition, for example, from German patent DE 199 48 400 A1 a relatively complicated adapter is known via which a terminal module can be secured tiltably to a rack and including thin-walled sections. The gist of the invention is thus to permit tilting without the mounting location of the terminal module matching in contour with those of the sections of the rack. Due to this agreement in accordance with prior art a genuine spindle is formed for the terminal module by the rack including, for example, round rods and the mounting locations on the terminal module being configured complementary thereto, in making rotation of the terminal module possible whilst the terminal module remains secured at least one-sidedly to the round rod. As compared to this, the invention now provides for the first time a terminal module having mounting locations of optional configuration which still permit, for example, also tilting about the rim of a thin-walled section. Such a rotation about a thin-walled section was hitherto not proposed. Thus the gist of the invention can be summarized in that no positive fixed connection permitting rotation is provided. Furthermore, the novel terminal module now permits securing or latching the terminal module to a section of a rack irrespective of a tiltable mount.

More particularly, the novel terminal module permits tilting without complicated additional means. The mounting location of the terminal module is configured as regards its surfaces such that the rim portion of a section of the rack can be mounted therein whilst simultaneously permitting a tilting motion about the rim of the section. This is achievable, for example, by an at least one-sided (as viewed cross-sectionally) mostly funnel-shaped configuration of the surfaces. The laterally defined "bottom" of the mounting location is seated on the rim of the section of the rack in defining the location of the terminal module thereby in a direction perpendicular to the surface of the thin-walled section. From the bottom the surfaces of the mounting location extend away from the surface of the section such that the described tilting motion about the rim of the section is made possible.

This now makes it possible by simple ways and means to tilt the terminal module relative to the rack in thus swiveling the terminal module out of place from a dense train and stack of terminal modules. The novel feature in this is that no separate means are now needed therefor. Instead, the cable cores or cross-coupling wires terminated by the terminal module can now advantageously be used as a "spindle". In detail, the terminal module can now be swiveled by the cited ways from the rack and remain sufficiently secured by means of the cable cores and/or cross-coupling wires for the short time in which changes are made to the terminal module or for removing protective components or other electronic modules. Once the necessary tasks have been done, the terminal module is swiveled back into place about the "virtual" spindle formed by the cores or wires and can be resecured by the full mounting of the section of the rack in the mounting location and latching action of the fastener. In this arrangement, this "virtual" spindle must not necessarily be fixedly located in space. Instead, it may move during the swiveling action in the mounting location. The reason for this is that the terminal module is tied to a certain extent by the terminated cores or wires. This means that as regards a swiveling action thereabout their change in location dictates the location of the spindle axis or at least influences it. Thus, "tiltable" in this case is to be understood that this does not necessarily involve a tilting motion about an axis precisely defined at all points in time. Instead, tilting in this case means that the terminal module is rotated out of its mounted position. without a precisely definable axis existing at all times therefore. It is furthermore to be noted that the novel terminal module now makes it possible to swivel a single module or a single terminal block as well as swiveling or tilting a train of modules or blocks out of place.

As mentioned, the terminal module includes at least one fastener by which the terminal module can be releasably secured to the rack, resulting in mounting the terminal module becoming particularly reliable.

The mounting location of the terminal module can be configured so that it is adapted for mounting a thin-walled section of a telecommunications rack. This thin-walled section may be formed, for example, by a strip of sheet-metal or a profile rail. Whilst such a thin-walled section was hitherto used for securing terminal modules such that tilting relative to the rack was impossible, the invention now makes tilting or rotation possible relative to the rack due to the configuration of the mounting location in each case without the contour of the section of the rack received by the mounting location needing to be specially adapted thereto.

Configuring the terminal module tiltable relative to a rack is achievable more particularly by the mounting location featuring a widening.

As aforementioned, the surfaces of the mounting location can be configured funnel-shaped at least one side. It needs to be noted in this case that block-type terminal modules are usually secured at two sides to thin-walled sections of a rack in thus permitting a tilting motion to one side only usually from the secured position in this mounting arrangement. In accordance therewith, the surfaces of the mounting location are to be configured trough-shaped at the corresponding side so that the intended tilting motion is permitted there, although of course, it is also possible to additionally configure the opposite surface of the mounting location funnel-shaped or widened to facilitate mounting the terminal module on the thin-walled section.

The fastener may include at least one first actuator which may be provided in the vicinity of the termination location of the terminal module with frontwise accessibility. Since the first actuator thus has facilitate frontwise accessibility, it is simple to actuate in releasing the terminal module at least one side. Subsequently, it can be tilted relative to the rack and swiveled out of the row of terminal modules arranged above and below.

Particular advantages materialize when at least a second actuator is provided in the vicinity of the fastener. This second actuator may be configured such that a tilting motion of the terminal module causes the section of the rack to engage and actuate it that it is automatically released. This means that for swiveling a terminal module out of place or fully releasing it relative to the rack, the fastener merely needs to be released one-sidedly. At this release side the terminal module can be subsequently lifted and tilted about the opposite side. At least temporarily the terminal module remains engaged at this at this side, however, by means of the fastener. It is not until later in the tilting motion that the cooperation between the so-called second actuator and the section against which the second actuator abuts in the course of the tilting motion is utilized to release the fastener likewise at this side. Subsequently the terminal module can be released in all from the rack This thus considerably facilitates swiveling the terminal module out of place and releasing it from the rack in rendering the terminal module accessible as a whole. More particularly, no actuation of two actuators in strict sequence to two different sides is needed. Instead, as cited above, actuating the fastener on the one side is handled by the section of the rack in the course of the tilting motion.

The terminal module may feature a ground contact including a contact portion for configuring contact with the rack. As aforementioned, the terminal module is preferably provided with overvoltage protection components or other electronic components. As an alternative or in addition thereto individual contacts of the terminal module may be used for terminating so-called shielding wires as needled in the case of cable cores for high signal transfer rates. Both these contacts and the overvoltage protection components need to be grounded. This was done hitherto by ground contacts on the terminal modules or overvoltage protection components provided forked with comparatively deep slots for mounting the rim of the thin-walled section of the rack. In the novel terminal module such a ground contact can be configured so that it is tiltable relative to, the section of the rack in thus combining the possibility of the tilting motion to advantage with forming a ground connection.

In this arrangement, the ground contact may be configured such that it springingly contacts the surface of the rack section in thus ensuring in both the secured condition of the module and in the course of the tilting motion that a reliably good electrical connection to ground is configured.

As mentioned, by the terminal module being tiltable relative to the rack, special advantages are now available when it includes overvoltage and/or overcurrent protection components needing to be replaced in certain situations. By it now being possible to tilt and swivel it out of place, access to sections is assured at which the corresponding components are employed. The cited components can be employed in a rearside portion.

In conclusion, the terminal module can be combined with cable cores, on the one hand, and cross-coupling wires, on the other, which are terminated at contacts of the terminal module and routed to different sides of the same. Particular advantages materialize when the terminal module can be tilted about the side to which the cross-coupling wires are routed. For the cross-coupling wires in this case no overlength or length in reserve needs to be provided. When swiveling the terminal module out of place relative to the rack the cross-coupling wires brought together at one side form so-to-speak a "virtual" spindle for the terminal module. Since as a result of this, the terminal module needs to be moved relative to the cross-coupling wires terminated thereby only by a very slight extent, having to provide the cross-coupling wires overlong can now be practically eliminated. In this arrangement it is, of course, just as conceivable to provide other constellations than arranging for the terminal module to be tiltable to the side with the cross-coupling wires. It is particularly in cramped space situations and with no need for the flexibility achieved by the cross-coupling wires that relatively thick cable bundles can be routed to the terminal module concerned. In this case too, it is, of course, just as possible to provide tilting about the imaginary axis running in the vicinity of or in such a cable bundle routed to the side of the terminal module.

The invention is furthermore characterized by the combination of a terminal module in one of the embodiments as described above with a telecommunications rack. The rack may include at least one thin-walled section, making a particularly simple configuration possible. This thin walled section may be formed, for example, by a profile rail or strip of sheet-metal. A rack may feature two profile rails oriented parallel to each other, two strips of sheet-metal arranged in parallel or a U-shaped tray, the opposite walls of which each form a thin-walled section of the rack.

BRIEF DESCRIPTION OF THE DRAWINGS

Example embodiments of the invention will now be detailed with reference to the drawings in which

FIG. 3 is a plan view of a second embodiment of a rack-mounted terminal module;

FIG. 4 is a plan view of the terminal module as shown in FIG. 3 illustrated tilted;

FIG. 5 is a plan view of a third embodiment of a terminal module mounted in rack and FIG. 6 is a plan view of the terminal module as shown in FIG. 5 illustrated tilted.

DETAILED DESCRIPTION OF PREFERRED EMBODIMENTS OF THE INVENTION

Figure 1:
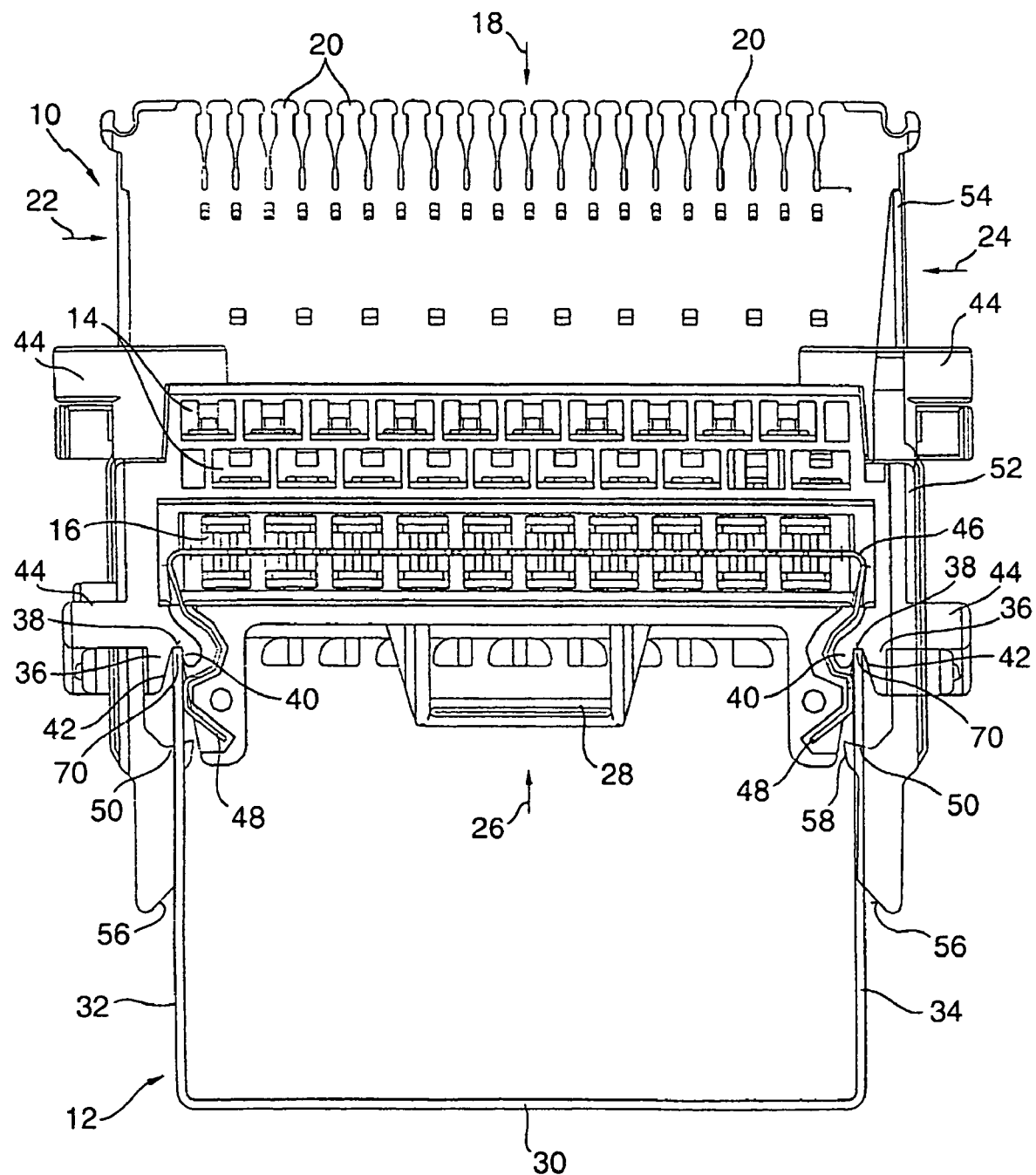
FIG. 1 is a view from underneath of a rack-mounted terminal module.

Referring now to FIG. 1 there is illustrated a view from underneath of the underside of the terminal module 10 mounted in a telecommunications rack 12. It is to be noted that in the example embodiment as shown in FIG. 1 the underside is the side at which overcurrent protection components or overvoltage protection components are insertable in suitable chambers 14 and 16 respectively. It is understood, however, that the chambers 14 and 16 may just as well be configured on the upper side resulting in the cited components being inserted at the top. In the operative condition in which the terminal module 10 is mounted in the rack 12 and in a telecommunications distribution point, the underside as evident from FIG. 1 is usually oriented horizontal. Provided at an accessible front side 18 in the example embodiment as shown are two rows of contacts in parallel including for example IDC locations, i.e. urging the cables cores into the spaces between the webs 20 as indicated, in which the IDC contacts are arranged, the latter bite through the insulation of the cables cores in making contact with the conductor. The cable cores are routed from the terminating location at the front side 18 to the left-hand side 22 or right-hand side 24 of the terminal module. In addition it is especially the incoming leads (unlike the cross-coupling wires) that are routed from the rear side 26 of the module through a suitable lug 28 and via the underside (not shown) to the individual contacts. It is to be noted that the cross-coupling wires in the example as shown are routed to the right-hand side 24. In this case it is to be noted that cable cores do not need to be routed necessarily from both sides to the terminal module as shown. Instead, the backbone cable cores, for example, may be integrated in a so-called cable plug which can be plugged into the terminal module as a single unit, for example, at the rear. This likewise still permits tilting of the terminal module in such an embodiment about cables cores routed sideways to the terminal module, where necessary, without a defined spindle.

As detailed in the following, the terminal module 10 is mounted in a telecommunications rack 12. As evident from the cross-section shown the latter has a substantially tray-shaped configuration including a bottom 30 as well as left-hand side wall 32 and a right-hand side wall 34. As an alternative, the rack could be configured by two substantially parallel oriented strips of sheet-metal mounted by a supporting structure such that their position and orientation correspond to that of the side walls 32, 34. It is furthermore to be noted that in the above description as regards the sides of the terminal module the rack 12 extends vertically in being typically oriented thereto. It is, however, just as conceivable that the rack extends with the side walls 32 and 34 horizontal so that the side surface areas 22 and 24 would be arranged top and bottom respectively and the surface area termed rear side as evident from the plan view in FIG. 1 forms a seating surface area. This conceivable different orientation has, however, no influence on the way in which the terminal module is secured to the rack and to the possibility of tilting relative to the rack 12 as explained in the following.

As evident from the example embodiment as shown in FIG. 1 the protective components mounted in the chambers 14 and chambers 16 are difficult to access in the secured condition of the terminal module 10 since further such modules are mounted above and below the module shown. In the terminal module as shown, however, access is however now assured by it permitting tilting relative to the rack 12 more particularly about the rim 70 of one of the side walls 32, 34 in thus enabling it to be swiveled out of place from several terminal modules located one above the other.

This is achieved by the mounting location 36 mounting the side wall 32 or 34 respectively or as termed generally the thin-walled section of the rack 12 being configured such that a tilting motion is possible. For this purpose, the mounting location includes surfaces facing the side wall 32 or 34 respectively. The rim 70 of the side wall 32 or 34 respectively in this arrangement is seated on a narrow strip-shaped location forming the highest portion of the mounting location 36 and termed bottom 38 in the following. It is from here that at the inner side a relatively short side surface 40 facing the inner side of the side wall 32 or 34 respectively extends. At the opposite side the corresponding outer side surface 42 is configured somewhat longer in the embodiment as shown and oriented slanting to the side wall 32 or 34 respectively. In other words, the more the outer side surface 42 becomes distanced from the bottom 38 the greater is the spacing to the surface of the side wall 32 or 34 respectively, although it is just as conceivable that this side surface 42 could be termed as half-sided funnel-shaped. It is understood that the side surfaces 40 and 42 need not necessarily be configured straight. Instead, they could be curved in any way as long as the tilting motion relative to the side wall 32 or 34 respectively as detailed below is not obstructed.

As regards the terminal module 10 it is furthermore to be noted that in the embodiment as shown in two different levels it includes wire routing means 44 on both sides serving the aforementioned routing of several cores to the sides 22 and 24 respectively of the terminal module 10. In addition, the terminal module 10 is provided with a ground rail 46 contacting, for one thing, the ground contacts of the overvoltage protection components mounted in the chambers 16. Should an overvoltage occur, the energy needs to be grounded via the ground rail 46. This is done in the embodiment as shown by two contact sections 48 with which the ground rail 46 contacts the corresponding inner surface area of the side wall 32 or 34 respectively. It is to be noted that accordingly the ground rail 46 is configured as regards the side walls 32 and 34 such that the tilting motion of the terminal module 10 as described in the following is made possible.

In conclusion, the terminal module 10 is prevented from being withdrawn from the rack 12 as well as locked in place against any movement in the direction of the run of the side walls 32 or 34 by fasteners 50 provided on both sides in the embodiment as shown. For this purpose, the side walls 32, 34 in the embodiment as shown feature openings or "windows" separate from each other. It is these windows that the fasteners 50 engage on both sides to subsequently prevent the terminal module 10 from being withdrawn from the front side 18 of the rack 12. In addition, the fasteners 50 are advantageously provided with a width (extending perpendicular to the plane of the drawing as shown in FIG. 1) which at the most is somewhat less than the width of the corresponding window in thus: enabling the corresponding fasteners 50 to be shifted only to a minor degree in the direction of the extent of the width (i.e. in the direction of the run of the side walls 32, 34). This results in the terminal module 10 being reliably located also in this direction relative to the rack 12. As an alternative, the rack may also include one or more profile rails which may be provided with a full length edge for latch-mounting the terminal modules in thus permitting the terminal modules to be shifted along the profile rails. Each fastener 50 is configured on a tab 52 which is usually configured via a suitable spindle integrally with the plastics housing of the terminal module 10 that the tab 52 is rotatable as a whole about an axis extending perpendicular to the plane of the drawing in enabling the fastener 50 to become disengaged. This is achievable, for example, by a pressure oriented inwards being exerted on the so-called first actuator 54 in the region of the front side 18 of the terminal module. Since the spindle of the tab 52 is located between the actuator 54 and the fastener 50, the fastener 50 is moved outwards when the actuator 54 is moved inwards, resulting in the terminal module 10 being released at one or both sides from the rack 12.

As regards the actions concerned with mounting the terminal module 10 in the rack 12 in achieving the position as shown in FIG. 1, it is to be noted that tab 52 is substantially pretensioned in the position as shown in FIG. 1. In a movement of the terminal module 10 in the direction of the bottom 30 of the rack 12 the bevel 56 firstly negotiates the rear end of the tab 52 at the rim 70 of each side wall 32 or 34 respectively and the tab is moved as a whole slightly outwards in this location. This movement is continued when the inside bevel 58 provided in the vicinity of the fastener 50 attains the rim 70 of the corresponding side wall. In further movement of the terminal module 10 in the direction as described the fasteners 50 finally attain the window in the side wall 32, 34 and "latch in place" therein so that the tab 52 assumes the position as shown in FIG. 1. The action of the hook-shaped or protruding fastener 50 engaging the rim of the window prevents the terminal module 10 from being withdrawn. In certain situations, for example when the components mounted in the chambers 14 and 16 need replacing, releasing the terminal module 10 from the rack 12 is necessary. In the case of the terminal module as shown, a release to one side is sufficient since the terminal module can be tilted about the other side and swiveled out of place completely from the combination of several terminal modules arranged one above the other.

Figure 2:
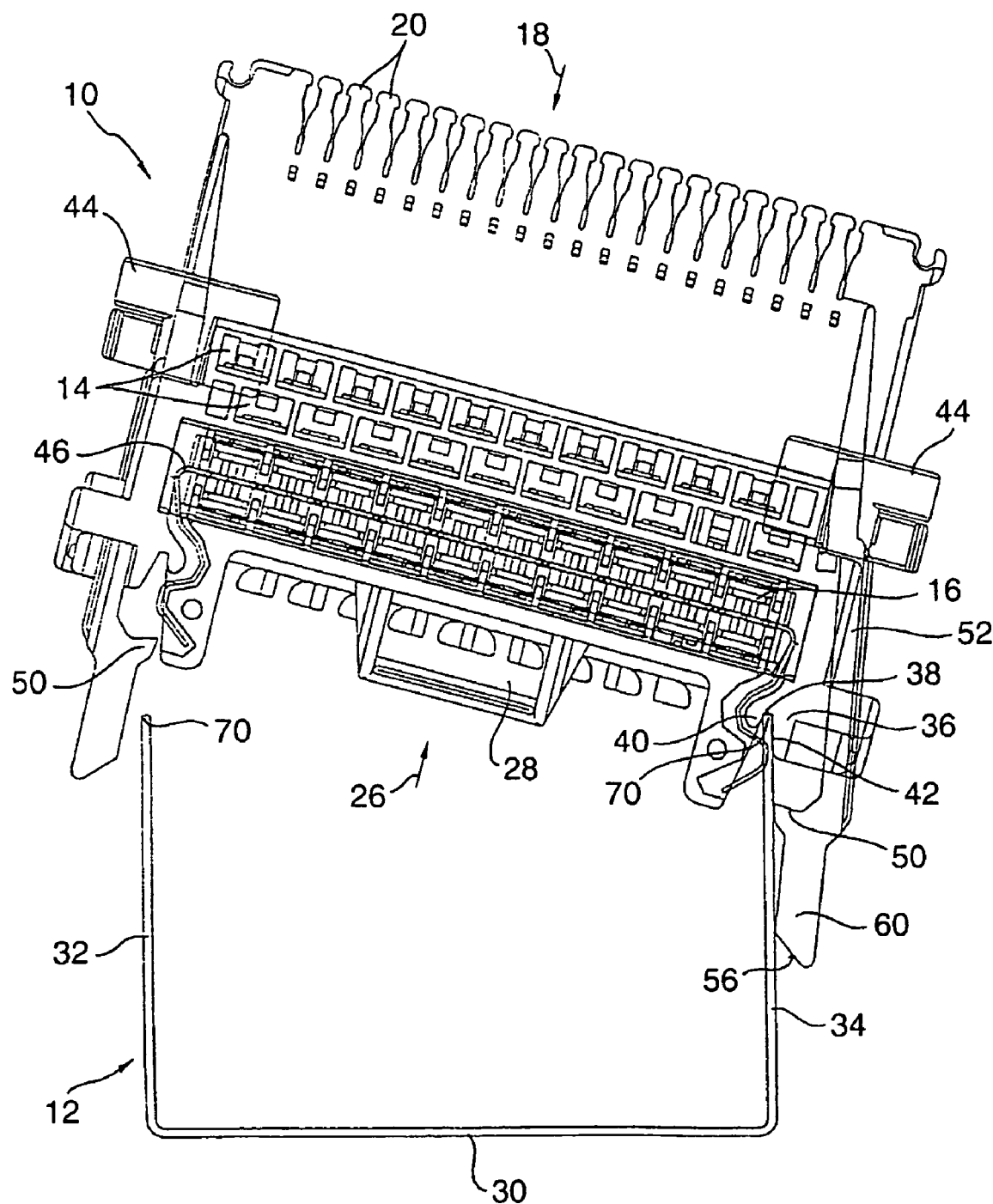
FIG. 2 is a view from underneath of the terminal module as shown in FIG. 1 illustrated tilted.

Referring now to FIG. 2 there is illustrated how the terminal module 10 is tilted relative to the rack 12. The fastener 50 on the left-hand side is temporarily disengaged to release the terminal module 10 on this side of the left-hand side wall 32. Due to the spacing (evident in FIG. 1) between the outer surface area of the right-hand side wall 34 and the opening outer surface 42 of the mounting location 36 for the terminal module 10, the terminal module 10 can be tilted relative to the rack 12 as shown in FIG. 2, while continuing to be seated on the rim 70 of the right-hand side wall 34 by the bottom 38 of the mounting location 36. This seating surface area forms the "virtual" spindle for the motion between the position as shown in FIG. 1 and that as shown in FIG. 2. This is assisted by the cross-coupling wires (not shown) routed from the contacts at the front side 18 of the terminal module 10 to the right-hand side and extending from the 16 terminal module 10 bundled perpendicular to the plane of the drawing. This permits the swivel action without the terminal module 10 being fully released or able to fall out of place. It is again to be noted that due to the terminal module being linked by the terminated cable cores, more particularly to the cross-coupling wires, the "virtual" spindle is free to move during the swivel or tilting action.

In the embodiment as shown an additional release at the right-hand side is made possible by the special configuration of the rear end of the tab 52. This may be necessary for extracting the terminal module 10 further from the combination of several terminal modules arranged one above the other in the direction of the front side 18 and in accessing also the components located relatively far to the rear, mounted in the chambers 16, to permit replacing them, for example. As evident from the rear portion of the tab 52 the section of a so-called second actuator 60 facing the side wall 34 contacts the outer surface area of the side wall 34 such that the tab 52 can be turned about its spindle so that the fastener 50 becomes disengaged. In other words, the tab 52 is elongated in a portion behind the fastener 50 in forming the second actuator 60 such that this actuator comes up against the side wall 34 in the tilting motion.

As a result of this, the tab 52 is involved only to a certain extent in the tilting motion of the terminal module 10 and is rotated counter-clockwise relative to the terminal module 10 as evident from comparing FIG. 1 and FIG. 2. Accordingly, the fastener 50 on the right-hand side in addition to the one on the left-hand side becomes disengaged and the terminal module 10 can be released as a whole from the rack 12. This thus makes it possible, in addition to the advantage of being able to tilt the terminal module 10 relative to the rack 12, of releasing the terminal module 10 from the rack 12 by particularly simple ways. compared with conventional solutions in this respect it is now no longer needed to simultaneously actuate actuators on both sides to disengage the fasteners on both sides. Instead, this now needs to be done for one side only, and in the course of the tilting motion the fastener on the other side is automatically disengaged in the embodiment as shown.

In all, the terminal module 10 is extremely functional since the protective components mounted in the chambers 14 and 16 are themselves integrated in the module in thus enabling, as evident from FIG. 2, the front portion of the terminal module 10 to represent a separate terminating location connected to the rear portion via suitable contacts 62. By integrating the protective components in the terminal module itself, the contacts remain accessible at the front side with no problem. Due to the advantage of being able to swivel a terminal module 10 out of place, the protective components integrated in a rear portion of the terminal module are likewise accessible. This possibility of swiveling the terminal module out of place is achieved, as aforementioned, by simple ways without any fixed spindles, adapters or similar complicated measures.

Referring now to FIG. 3 there is illustrated a second embodiment of the novel terminal module substantially corresponding to that as shown in FIG. 1. This applies as regards the corresponding mounting location 36 and the fastener 50 substantially being the same as in the embodiment as shown in FIG. 1. It is, however, to be noted that the mounting locations 36 of the terminal module 10 in this case are adapted to mount a section of a rack formed by two profile rails 64 in parallel. The profile rails 64 may be fabricated, for example, by extrusion from a suitable material such as aluminum, for instance. The two profile rails 64 are joined and secured by a clip 65 such that, in all, a U-shaped configuration materializes corresponding to the shape of the rack 12 as shown in FIGS. 1 and 2. In a front portion each profile rail 64 features at its outer side a substantially strip-shaped recess running in the direction of the profile rail (i.e. in the direction perpendicular to the plane of the drawing). This recess 66 forms at its end nearer to the free rim 70 of the profile rail 64 a protuberance for engaging the fastener 50. Since the recess 66 in this case is configured over the full length of the profile rail a terminal module 10 can be shifted along the two profile rails 64 in the mounted condition.

It is understood that the profile rail may also be configured otherwise, of course. For example, the protuberance for engaging the fastener 50 may be provided not as part of a recess in the profile rail but instead the profile rail could be offset as a whole to its lower portion such that it protrudes at the necessary location for engaging the fastener 50.

Referring now to FIG. 4 there is illustrated how in this example embodiment too, the terminal module 10 can be tilted to one side of the profile rail 64. The mounting location 36 is, as aforementioned, configured substantially the same as in the embodiment as shown in FIGS. 1 and 2, in being in general funnel-shaped. As a result of this, for example after the fastener 50 on the left-hand side as shown in FIG. 4 has been released, the terminal module 10 can be rotated about the free rim 70 of the profile rail 64 on the right-hand side. In this arrangement the actuator 60 is adapted to the continuation of the profile rails 64 such that during this rotational motion the fastener 50 also becomes disengaged at the side about which rotation was made, in thus enabling the module to be released as a whole from the rack as described above. For the sake of completeness it is to be noted that the embodiment as shown in FIGS. 3 and 4 is a terminal block having no over current or over voltage protection components or other electronic components. It is understood, however, that this could be the case and that more particularly also the terminal module as shown in FIGS. 1 and 2 could be mounted on the rack as shown in FIGS. 3 and 4. Conversely, the embodiment of the module as shown in FIGS. 3 and 4 could also be combined with the rack as shown in FIGS. 1 and 2.

Referring now to FIGS. 5 and 6 there is illustrated how a further embodiment of a terminal module 10 can be combined with both the rack mounting system as shown in FIGS. 1 and 2 (see FIG. 5) as well with the rack mounting system as shown in FIGS. 3 and 4 (see FIG. 6). The special feature in the terminal module 10 as shown in FIGS. 5 and 6 is that it is a specially configured terminal block on the exchange (office) side. These terminal blocks on this side of a distribution point are usually mounted in horizontal racks in a distribution point. The cable cores brought out from the terminal modules on this side lead, for example, to the so-called exchange or switch of a telecommunications company. However, in this case too, it is to be noted that the block as shown in FIGS. 5 and 6 could also be put to use in other ways, it furthermore being noted that the block as shown in FIGS. 5 and 6 must not necessarily be used, of course, at the exchange (office) side.

The terminal module 10 as shown in FIGS. 5 and 6 may in addition be termed "reversible" since in this case cable cores can be terminated at both the front side 18 and rear side 68. It is usually the case that the cables cores at the rear side 68 lead to the office systems. To advantage these can be bunched into a cable connector at the exchange side which can be plugged as a whole into the rear side 68 of the terminal module 10. As evident from FIG. 5 such a terminal module may also be configured in accordance with the invention so that tilting relative to the rack 12 is possible without a "real" spindle existing for this purpose or without further complicated measures being necessary. For this purpose, the mounting locations 36 of the terminal module 10 are configured substantially the same as described in the previous embodiments. The non-tilted condition of the embodiment as shown in FIG. 5 substantially corresponds to the embodiment as shown in FIG. 1

Referring now to FIG. 6 there is illustrated how this embodiment of a terminal module can also be combined with a rack having two profile rails 64 running parallel to each other, this corresponding substantially to those as shown in FIG. 4.

We claim:

1. A telecommunications terminal module including:
   (a) a terminal module including at least one location for mounting a section of a telecommunications rack that includes a first rim, and
   (b) the mounting location including surfaces facing said section of the telecommunications rack, the mounting location including a first side and a second side in a facing relation about an opening receiving the rim, the first side having a length shorter than a length of the second side, wherein at least a portion of the second side slants at an angle with respect to the first side so that said terminal module can be tilted from the condition as secured to said rack relative to said section about the first rim thereof, wherein the terminal module further includes at least one fastener by which said terminal module is secured to said rack releasably.

2. The terminal module as set forth in claim 1, wherein said mounting location is adapted to mount a thin-walled section of the rack.

3. The terminal module as set forth in claim 1, wherein said surfaces of said mounting location are configured funnel-shaped on at least one side.

4. The terminal module as set forth in claim 1, wherein said fastener includes at least one first actuator in the vicinity of a terminating location of said terminal module.

5. The terminal module as set forth in claim 4, comprising at least one second actuator disposed near the fastener actuated on tilting motion by said section of said rack such that said fastener becomes disengaged.

6. The terminal module as set forth in claim 2, comprising a ground contact provided with a contact portion for configuring a contact with said rack which is tiltable relative to said section of said rack.

7. The terminal module as set forth in claim 6, wherein said contact portion springingly contacts said thin-walled section.

8. The terminal module as set forth in claim 1, comprising at least one of overvoltage protection components; overcurrent protection components; electronic components; and splitter modules.

9. The terminal module as set forth in claim 1 further comprising terminated cable cores, on the one hand, and cross-coupling wires, on the other, routed to different sides of said terminal module, said terminal module being tiltable about the side to which said cross-coupling wires are routed.

10. An assembly comprising at least one terminal module as set forth in claim 1 and a telecommunications rack.

11. The assembly of claim 10, wherein said rack includes at least one thin-walled section.

12. The assembly of claim 11, wherein said thin-walled section is formed by a strip of sheet-metal, a profile rail or walls of a U-shaped tray.

* * * * *